Patented Aug. 7, 1945

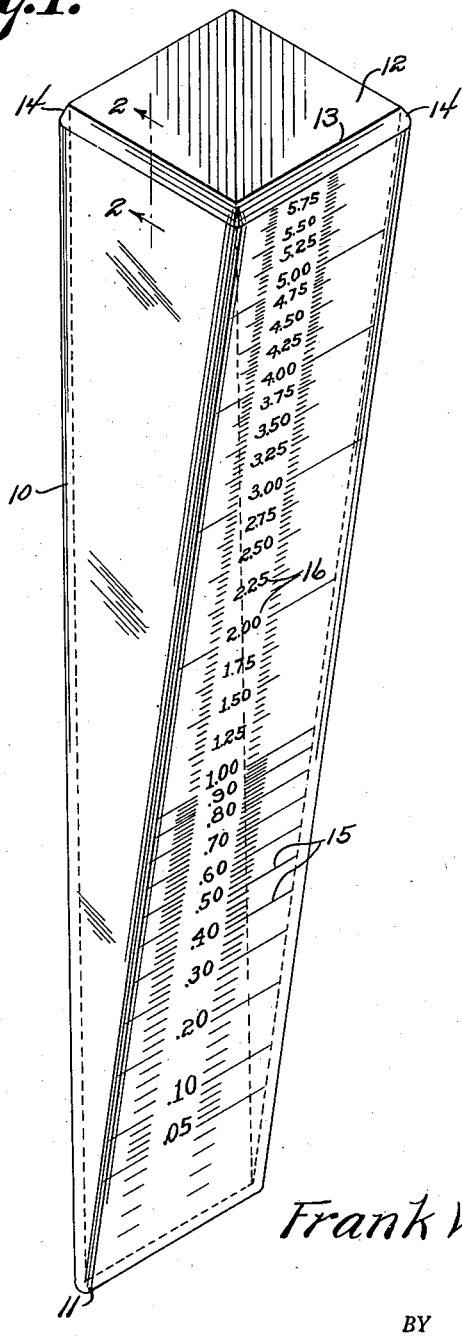
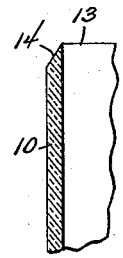

2,381,602

UNITED STATES PATENT OFFICE 2,381,602

RAIN GAUGE

Frank W. Larson, Sioux City, Iowa

Application January 24, 1944, Serial No. 519,496

1 Claim. (Cl. 73—171)

The invention relates to a gauge, and more particularly to a rain gauge.

The primary object of the invention is the provision of a gauge of this character, wherein it can be anchored near to the ground at a clear space, removed from buildings, trees or other obstructions, so as to trap rain water during a rainy period, to enable one to determine the extent of rain fall at such period, the gauge reading being readily and easily had at intervals of time, the readings having exposure for visibility and the water level within had with dispatch.

Another object of the invention is the provision of a gauge of this character, wherein the water entrance open top thereto is knife edged, with its bevel formation outwardly, so as to divide the rain during the fall thereof and in this manner assuring a true catch within the container therefor.

Another object of the invention is the provision of a gauge of this character, which is simple in construction, thoroughly reliable and efficient in its working, strong, durable, possessing no intricate parts, it being a unitary structure, readily portable, easily read for measuring rain fall, and inexpensive to manufacture and install.

With these and other objects in view the invention consists in the features of construction, combination and arrangement of parts as will be hereinafter more fully described, illustrated in the accompanying drawing, which shows the preferred form of the invention, and pointed out in the claim hereunto appended.

In the accompanying drawing:

Figure 1 is a perspective view of the gauge constructed in accordance with the invention.

Figure 2 is a sectional view taken on the line 2—2 of Figure 1 looking in the direction of the arrows.

Similar reference characters indicate corresponding parts throughout the several views in the drawing.

Referring to the drawing in detail the gauge constituting the present invention comprises an elongated receptacle 10, preferably made from material rendering the same transparent, in this instance, it is shown made from glass, and of tapered flat faced formation, although it may be round or any other selected shape, if desired. The receptacle 10 is formed with a narrow closed lower end 11, while the wider upper end 12 is open.

The upper open end 12 is preferably formed with a knife edged rim 13, having the bevel 14 outwardly and the purpose of this rim is to divide the rain fall or in other words to shed water at this open end 12, so that the receptacle 10 will procure its rightful quantity for gauging purposes.

On an outer side of the receptacle 10 and longitudinally thereof from the lower to the upper ends thereof is a measuring rain fall scale in inches and fractions thereof as may be contained within the said receptacle 10, as caught thereby during a rainy period, the scale involving the markings 15 and digits 16, respectively.

The receptacle 10 is hung upon a post or other support, not shown, in any desirable manner, so that the open top end 12 is unobstructed, to enable the trapping of rain water during a rain fall, and the scale upon this receptacle enables a reading of the level of the content thereof, which permits by measurement, the extent of rain fall in a determined period of time. The scale is readily visible at the exposed side of the receptacle, so that it can be readily, quickly and easily read, the level of the content within the receptacle 10, being clearly visible from without the latter for co-action with the scale.

From the foregoing it is thought that the construction and manner of use of the gauge will be clearly understood, and therefore, a more extended explanation has been omitted, as well as for the sake of brevity.

What is claimed is:

A one-piece transparent graduated receptacle for measuring rainfall, said receptacle having a wedge shaped, tapered formation from its top to its bottom, the top being open to pass rain into the interim of the receptacle, and the top edge being formed with an outward bevel forming a knife edge at the point where the edge meets the inner wall of the receptacle.

FRANK W. LARSON.